US000001880H

United States Statutory Invention Registration [19]

[11] Reg. Number: H1,880

Vines et al.

[45] Published: Oct. 3, 2000

[54] SYSTEM AND METHOD FOR PROCESSING WIRELESS VOICE AND DATA TELECOMMUNICATIONS

[75] Inventors: Shawn W. Vines, Bartlett, Tenn.; Dexiang John Xu, Cordova, Tex.

[73] Assignee: DSC/Celcore, Inc., Plano, Tex.

[21] Appl. No.: 09/160,809

[22] Filed: Sep. 25, 1998

Related U.S. Application Data

[60] Provisional application No. 60/071,449, Jan. 12, 1998.

[51] Int. Cl.[7] ..... H04B 7/00

[52] U.S. Cl. ..... 370/310

*Primary Examiner*—Daniel T. Pihulic
*Attorney, Agent, or Firm*—John G. Flaim

[57] ABSTRACT

A system for processing data is provided. The system includes a data type detector that determines whether a data frame is a speech/voice data frame or a data/fax data frame. The system further includes a transcoder and rate adapter system that is connected to the data type detector. The data type detector transfers the data frame to the transcoder and rate adapter system if the data frame is a voice data frame. An interworking function system is also connected to the data type detector. The data type detector transfers the data frame to the interworking function system if the data frame is a data/fax data frame.

22 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

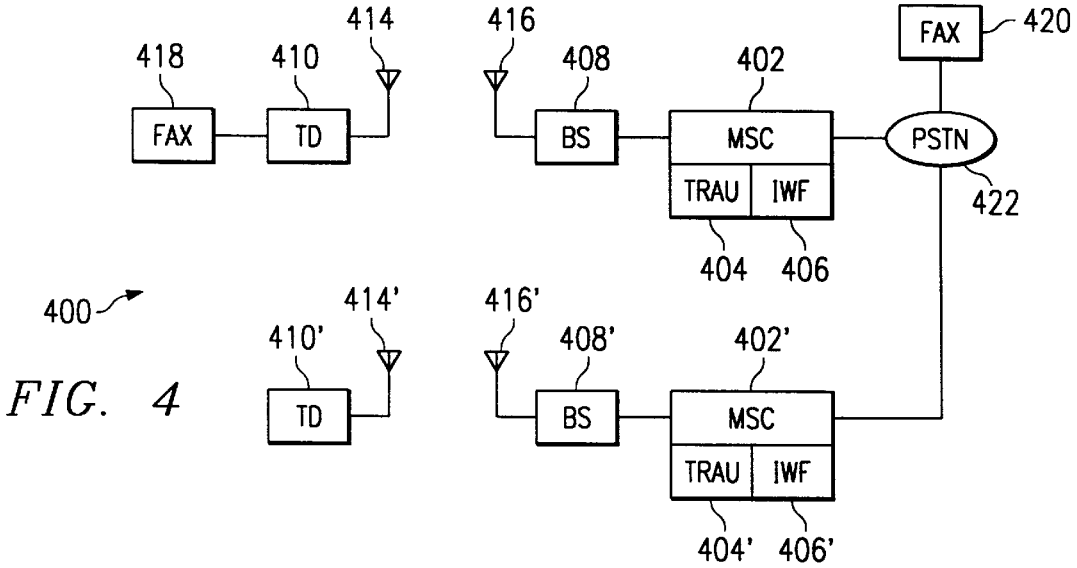
FIG. 4
FIG. 5
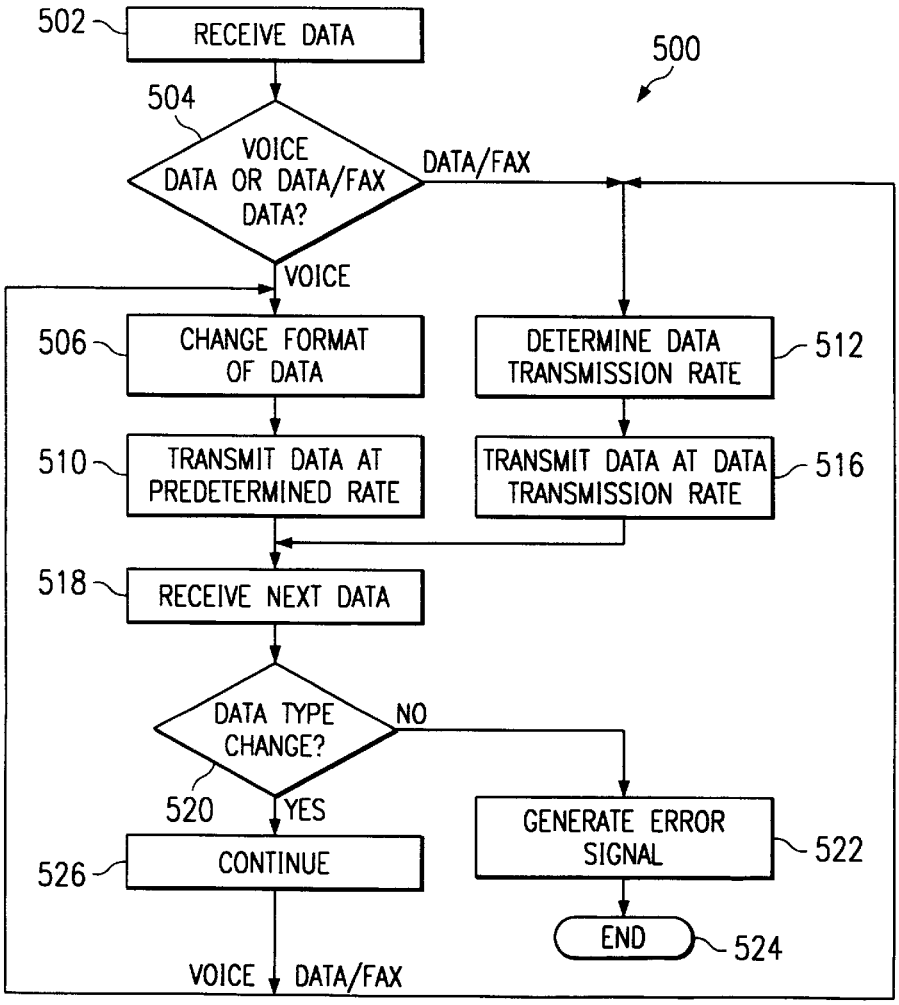

SYSTEM AND METHOD FOR PROCESSING WIRELESS VOICE AND DATA TELECOMMUNICATIONS

RELATED PATENT APPLICATIONS

The present patent application claims priority from the United States provisional patent application designated with Ser. No. 60/071,149, entitled "Communication System Interworking Function," naming Shawn W. Vines as inventor, and which was filed on Jan. 12, 1998.

RELATED PATENT APPLICATIONS

The present patent application is related to the following patent applications: (a) U.S. patent application Ser. No. 09/025,870, "Integrated Telecommunications System," DSC Case No. 834-00, naming Scott D. Hoffpauir and Anthony G. Fletcher as inventors, commonly owned and assigned with the present application and filed contemporaneously with this application; and (b) U.S. patent application Ser. No. 08/678,254, now U.S. Pat. No. 5,835,486, "MultiChannel Transcoder Rate Adapter Having Low Delay and Integral Echo Cancellation," naming James M. Davis and James D. Pruett as inventors, filed Jul. 11, 1996, commonly owned and assigned with the present application.

FIELD OF THE INVENTION

The present invention relates generally to systems for switching wireless telecommunications, and more particularly to a system and method for processing wireless voice and data telecommunications.

BACKGROUND

Telecommunications data may include speech/voice data that is analog or digitally encoded. This speech/voice data may be decoded to generate audio speech/voice signals. Telecommunications data may also include data/fax data that is analog or digitally encoded. This data/fax data may be decoded to yield data in a format that may be used by data processing equipment, computers, facsimile equipment, or other equipment. In general, speech/voice data and data/fax data that is digitally-encoded must be processed in different manners by telecommunications data processing system and components.

For example, speech/voice data that is compatible with the Global System for Mobile Communications standards must receive transcoder and rate adaption processing after it has been received from the base station transceiver before it may be transmitted over the public switched telephone network. In a similar manner, data/fax data must receive interworking function processing before it may be transmitted over the public switched telephone network. Transcoder and rate adaption processing is performed by different systems and components than interworking function processing.

Because different systems and components are used to perform transcoder and rate adaption processing and interworking function processing, it is necessary to switch and transmit telecommunications data to one set of components for the first type of processing and to a second set of components for the second type of processing. At least one set of these components may be external to the telecommunications switch, which results in additional transmission and switching delays. Furthermore, because system capacity is typically limited by the switch and not by the support equipment, additional systems and components are required for performing transcoder and rate adaption processing and interworking function processing than will typically be used at any given time.

SUMMARY OF THE INVENTION

Therefore, a need has arisen for a system and method for processing speech/voice telecommunications data and data/fax telecommunications data that does not require the telecommunications data to be processed by different system(s) and component(s).

In accordance with the present invention, a system and method for processing telecommunications data are provided that substantially eliminate or reduce disadvantages and problems associated with previously developed systems and methods.

One aspect of the present invention is a system for processing data is provided. The system includes a data type detector that determines whether a data frame is a speech/voice data frame or a data/fax data frame. The system further includes a transcoder and rate adapter system that is connected to the data type detector. The data type detector transfers the data frame to the transcoder and rate adapter system if the data frame is a voice data frame. An interworking function system is also connected to the data type detector. The data type detector transfers the data frame to the interworking function system if the data frame is a data/fax data frame.

The present invention provides many important technical advantages. One important technical advantage of the present invention is system that allows transcoder and rate adaption processing and interworking function processing to be performed by the same system(s) or component(s) . The system of the present invention thus simplifies the processing of telecommunications data that may be either speech/voice data.:or data/fax data by allowing that telecommunications data to be processed by the same system(s) or component(s).

Another important technical advantage of the present invention is a method for processing telecommunications data that allows both speech/voice data and data/fax data to be processed by the same system(s) and component(s). The method of the present invention thus allows the same system(s) or component(s) to perform transcoder and rate adaption processing or interworking function processing on telecommunications data.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 4 is a diagram of a wireless telecommunications system embodying concepts of the present invention;

FIG. 5 is a flow chart of a method for processing wireless voice and data communications in accordance with one embodiment of the present invention;

DETAILED DESCRIPTION OF THE DRAWINGS

Figure 1:
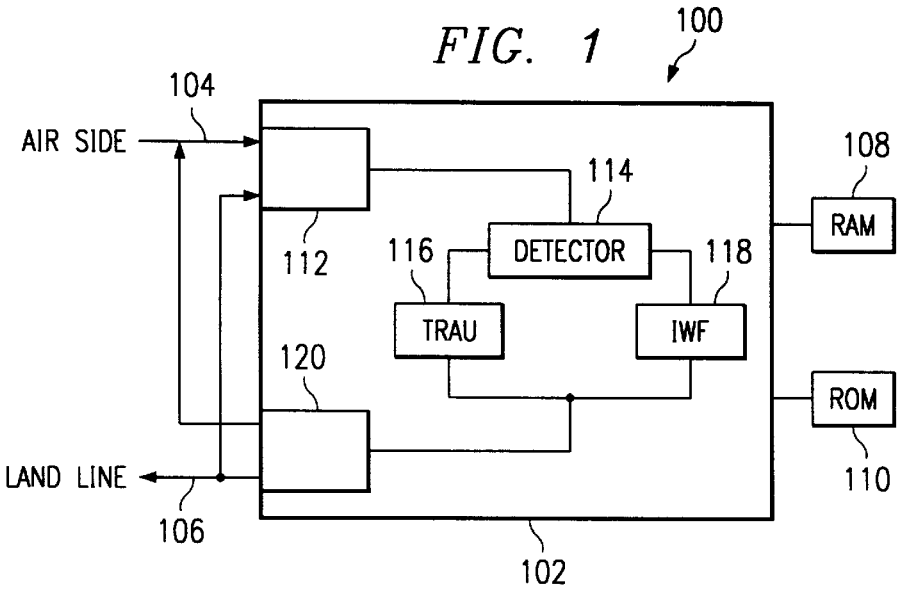
FIG. 1 is a block diagram of a system for processing wireless voice and data communications embodying concepts of the present invention.

FIG. 1 is a block diagram of a system 100 for processing wireless voice and data communications embodying concepts of the present invention. System 100 includes digital signal processor 102, air side data path 104, and land line date path 106. In addition, system 100 may also include random access memory 108 and read-only memory 110, each of which are coupled to digital signal processor 102.

Digital signal processor 102 is an integrated circuit containing data processing components, data storage components, and other suitable integrated circuit devices. For example, digital signal processor 102 may be an Analog Devices 2106X digital signal processor integrated circuit, or other suitable digital signal processor integrated circuits. Digital signal processor 102 may include sufficient random access memory and read-only memory for all data processing applications or may utilize discrete components that are coupled to digital signal processor 102 through suitable connections.

Air side data channel 104 is a digital data conductor, such as a data bus, coaxial cable, fiber optic cable or other suitable conductors. Air side data channel 104 carries digitally encoded telecommunications data from a wireless system to digital signal processor 102. For example, air side data channel 104 may be coupled to a mobile station controller that is further coupled to a base station having an antenna. Wireless data communications are conducted to digital signal processor 102 through the base station and mobile station controller to air side data conductor 104. Other suitable configurations may be used. Air side data conductor 104 may be used to transfer data simultaneously from and to digital signal processor 102, or may alternatively be used in a single direction mode such that data may be either transmitted to or transmitted from digital signal processor 102 at any moment.

Land line data channel 106 is a suitable data conductor for transferring telecommunications data from digital signal processor 102 to a switched network. For example, land line data channel 106 may transfer data from digital signal processor 102 to a mobile station controller, a public switched telecommunications network, and ultimately to a terminal device. Other suitable configurations may be used.

Random access memory 108 is a digital data memory device that may be used to controllably store and retrieve digital data. If digital signal processor 102 contains sufficient random access memory, the discrete random access memory unit 108 is not required. Random access memory unit 108 may be used to store operational programs, operational data, real time data for processing by digital signal processor 102, or other suitable telecommunications data and system support and operations data.

Read-only memory 110 is a suitable digital data memory device that is used to store semi-stable data. For example, read-only memory 110 may be used to store programming that is downloaded onto digital signal processor 102 to implement systems operating on digital signal processor 102. Detector system 114, transcoder and rate adapter system 116, and interworking function system 118 may be software implemented systems that use programming stored on read-only memory. 110 to be implemented by digital signal processor 102.

Digital signal processor 102 includes input system 112, detector system 114, transcoder and rate adapter system 116, interworking function system 118, and output system 120, which are systems operating on digital systems processor. These systems may comprise hardware, software, or a suitable combination of hardware and software, and may be discrete systems or subsystem components of a single unified system.

In operation, telecommunications data is received from air side data conductor 104 or landline data conductor 106 at digital signal processor 102. Digital signal processor 102 determines whether the telecommunications data comprises speech/voice data, such as telephonic conversations, data converted into a digital data format, or data/fax data, such as facsimile data, computer-usable data from a processor or other computer equipment, or other similar data. This determination is made by detector system 114. If the telecommunications data is determined to be voice telecommunications data, detector system 114 transfers the data to transcoder and rate adapter system 116, where it is converted to data having an appropriate format and a suitable data transmission rate. For example, transcoder and rate adapter system 116 may convert data from a Global System for Mobile Communication data format at a frequency of 16 kilobits per second, into a pulse code modulation data format at a frequency of 64 kilobits per second.

Alternatively, if the telecommunications data is determined to be data/fax data, detector system 114 transfers the data to interworking function system 118. Interworking function system 118 converts the data transmission rate and format to a data transmission rate and format of a receiving terminal device. The type of conversion to be done is dependent not only on the detector system but on the IWF configuration system 130 which provides the IWF information necessary to perform the conversion between the transmitting terminal device and the receiving terminal device. For example, at call setup, configuration information is sent to the IWF messaging system which communicates with the mobile station controller. This information would be provided to the IWF configuration system 130 which would then configure the IWF system 114.

The information communicated to the IWF configuration system 130 may be, for example, a Local Communication (LCOM) protocol. An example of an LCOM protocol is provided and described by U.S. patent application (ref. 24194000.193), which is hereby expressly incorporated by reference for all purposes. The LCOM message header may have the following exemplary format:

| LCOM Header | | |
|---|---|---|
| Slot ID | Process ID | Length |

Slot ID is defined as the SPM board value associated with the appropriate DSP containing the IWF system. Process ID is defined as the SPM Process associated with the appropriate DSP containing the IWF system. Length is the total length in bytes of the entire message The body of the IWF configuration message may contain the following data fields:

| | |
|---|---|
| Connection Element: | Transparent/Non-Transparent represented by integer values |
| Data Compresion Allowed: | True / False represented by integer values |
| Origination/Termination: | Origination/Termination represented by integer values |
| Air Baud Rate: | List of allowable baud rates represented by integer values |
| Connection Type: | UDI/3.1 KHz represented by integer values |
| Modulation Protocol: | Fax / V.34 represented by integer values |
| Network Baud Rate: | List of allowable baud rates represented by integer values |
| Intermediate Rate: | 8 KHz / 16 KHz represented by integer values |
| Sync Type: | Synchronous / Non-synchronous represented by integer values |
| Data Bits: | 8 bits per byte / 7 bits per byte represented by integer values |
| Parity: | Odd/Even/None/Forced to Zero/ Forced to One represented by integer values |
| Stop Bits: | 2/1 represented by integer values |

As shown in FIG. 1, digital signal processor 102 may receive data from an air side terminal device or a landline terminal device.. For example, a user of a wireless mobile communications system may place a telephone call to a wire line terminal device through the public switched telephone network. Digital signal processor 102 may be used to convert the telecommunications data into a format or transmission speed usable by the wireline terminal device. Also or alternatively, digital signal processor 102 may be used to convert voice/speech data or data/fax data communications from a wireline terminal device into a data format or data transmission rate suitable for use with a wireless terminal device accessible via air side telecommunications channel 104.

Figure 2:
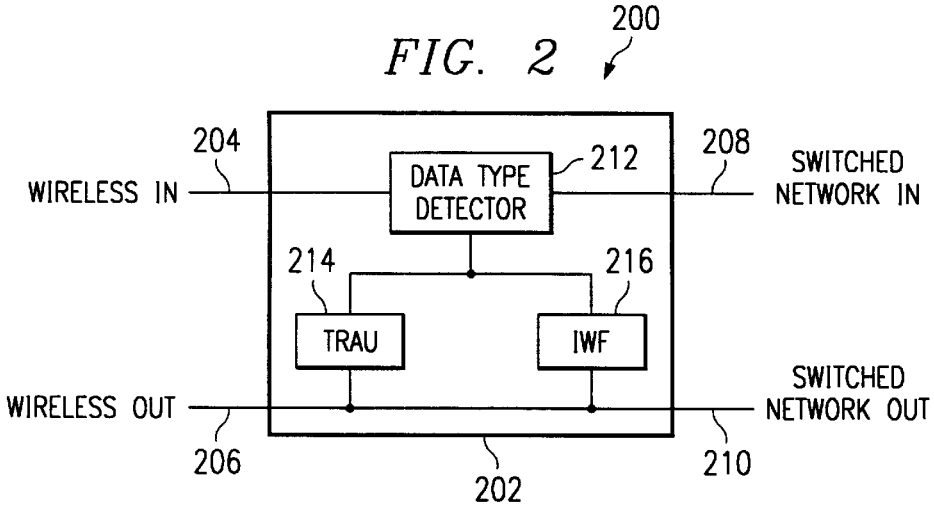
FIG. 2 is a block diagram of a system for processing wireless voice and data communications in accordance with teachings of the present invention.

FIG. 2 is a block diagram of a system 200 for processing wireless voice and data communications in accordance with teachings of the present invention. System 200 includes platform 202, which may be implemented in hardware, software, or a suitable combination of hardware and software. For example, platform 202 may be a digital signal processor integrated circuit, a general purpose computer, an application-specific integrated circuit, a field programmable gate array, or other suitable devices. System 200 also includes wireless input channel 204, wireless output channel 206, switched network input channel 208, and switched network output channel 210.

Platform 202 further comprises data type detector system 212, which is coupled to transcoder and rate adapter system 214 and interworking function system 216. Telecommunications data received from wireless input channel 204 and switched network input channel 208 is processed by data type detector system 212 to determine whether it is speech/voice type data or data/fax type data. If the telecommunications data is speech/voice type data, it is transferred to transcoder and rate adaption system 214. If the telecommunications data is data/fax type data, it is transferred to interworking function system 216. The telecommunications data is then processed by the corresponding system and transferred to wireless output channel 206 or switched network output channel 210, as suitable.

Data type detector system 212 may comprise hardware, software, or a suitable combination of hardware and software. For example, data type detector system 212 may comprise one or more software systems operating on a digital signal processor integrated circuit, general purpose computing platform, application-specific integrated circuit, or other suitable processing platforms. Also or alternatively, data type detector system 212 may be realized partially or completely by an application specific integrated circuit, field programmable gate array, or other suitable devices. Data type detector system 212 is operable to determine whether data is encoded speech/voice data or data/fax data, such as by comparing the value stored in a predetermined data field to a table of allowable data values, by analyzing the structure of the data, or by other suitable means. Data type detector system 212 is further operable to transfer the data to a suitable system for subsequent processing, such as transcoder and rate adaption system 214 if the data is speech/voice data, or interworking function system 216 if the data is data/fax data.

Transcoder and rate adaption system 214 may comprise hardware, software, or a suitable combination of hardware and software. For example, transcoder and rate adaption system 214 may comprise one or more software systems operating on a digital signal processor integrated circuit, general purpose computing platform, application specific integrated circuit, or other suitable processing platforms. Also or alternatively, transcoder and rate adaption system 214 may be realized partially or completely by an application specific integrated circuit, field programmable gate array, or other suitable devices. Transcoder and rate adaption system 214 is operable to encode telecommunications data from a first data format to a second data format, and to decode the telecommunications data from the second data format to the first data format. Transcoder and rate adaption system 214 is further operable to change the data transmission rate of the telecommunications data from a first rate to a second rate, and from the second rate to the first rate.

Interworking function system 216 may comprise hardware, software, or a suitable combination of hardware and software. For example, interworking function system 216 may comprise one or more software systems operating on a digital signal processor integrated circuit, general purpose computing platform, application-specific integrated circuit, or other suitable processing platforms. Also or alternatively, interworking function system 216 may be realized partially or completely by an application specific integrated circuit, field programmable gate array, or other suitable devices. Interworking function system 216 is operable to interface with a terminal device to determine a data transmission rate, to adjust the data transmission rate of data to match that data transmission rate, and to transfer the telecommunications data at that data transmission rate.

Wireless input data channel 204 and wireless output data channel 206 are wireless system data input and output channels. For example, wireless input data channel 204 and wireless output data channel 206 may comprise digitally-encoded data in a suitable format, such as Global System for Mobile Communications standard format that is received over a copper conductor at a transmission frequency of 16 kilobits per second. Other suitable data formats, transmission media, and transmission rates may be used.

Switched network input data channel 208 and switched network output data channel 210 are wireless system data input and output channels. For example, switched network input data channel 208 and switched network output data channel 210 may comprise digitally-encoded data in a suitable format, such as a pulse code modulation standard data format that is received over a copper conductor at a transmission frequency of 64 kilobits per second. Other suitable data formats, transmission media, and transmission rates may be used. Switched network input data channel 208 and output data channel 210 may interface with the public switched telephone network, the public land mobile network, or another suitable switched network.

In operation, data type detector system 212 receives telecommunications data from wireless input channel 204 or switched network input channel 208, and determines whether the data is voice/speech data or data/fax data. For example, data type detector system 212 may receive a GSM data frame in which bits C1 through C5 include frame data type identifiers. For example, GSM 08.60 version 5.1.0 identifies data bits C1 through C5 for speech data as 00010 or 11010 for the uplink and 11100 or 11010 for the downlink, and for data frames, bits C1 through C5 are 01000 for the uplink and 10110 for the downlink. Other data frame identification codings may be used where suitable. Data type detector system 212 transmits the data frames to transcoder and rate adapter system 214 if the data frames contain voice/speech data, and transfers the data to interworking function system 216 if the data contains data/fax data. Data received over wireless input channel 204 is transmitted to switched network output channel 210. Likewise, data received over switched network input channel 208 will be transmitted to wireless output channel 206 after appropriate conversion.

Figure 3:
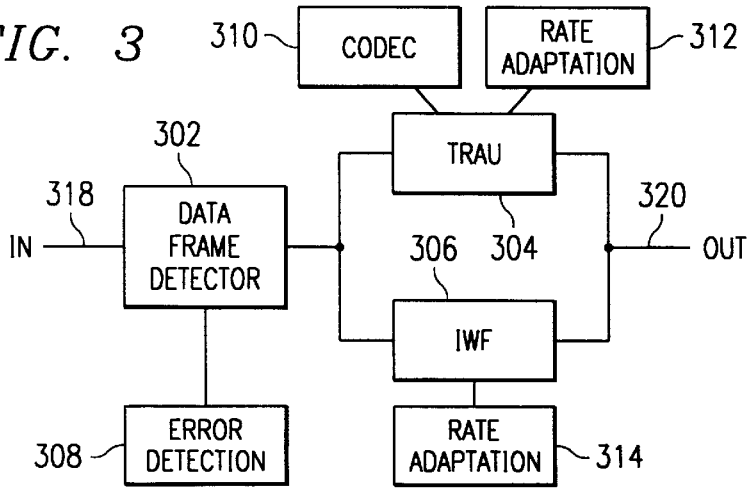
FIG. 3 is a block diagram of a system for processing wireless voice and data communications in accordance with concepts of the present invention.

FIG. 3 is a block diagram of a system 300 for processing wireless voice and data communications in accordance with concepts of the present invention. System 300 includes data frame detector system 302, which is coupled to transcoder and rate adaption system 304 and interworking function system 306. System 300 may be implemented in hardware, software, or a suitable combination of hardware and software.

Data frame detector system 302 is coupled to input channel 318 and error detection system 308. Telecommunications data is received over input channel 318 and is analyzed by data frame detector system 302 to determine whether the data is encoded speech/voice data or data/fax data. For example, data frame detector system 302 may detect predetermined bits in a data frame and compare them with stored values that identify the data frame as either speech/voice data or data/fax data. Data frame detector system 302 then transfers the data to transcoder and rate adapter system 304 if the data is speech data, or transfers the data to interworking function system 306 if the data is data/fax data. Alternatively, data frame detector system 302 may use another criterion or other criteria to determine whether the data is speech/voice data or data/fax data, including but not limited to pattern recognition, header data for asynchronous transfer mode variable length data packets, or other suitable methods or systems.

Error detection system 308 is used in conjunction with data frame detector system 302 to determine if the data transmission type received over input channel 318 has improperly changed. For a given telecommunications channel, a change between speech/voice data and data/fax data might only be allowed after certain call setup, signaling, or control processes have been performed. For example, it may be necessary to verify that the receiving end terminal device is capable of processing data/fax data before transmission of data/fax data will be allowed. Error detection system 308 is used to detect when a change is made from a first type of data, such as speech/voice data or data/fax data, to another type of data on two successive frames.

For example, in a speech/voice data channel, one frame of data may be corrupted and may indicate that it is data/fax data or an unknown data type. Error detection system 308 is used to prevent this data frame from inadvertently being encoded and processed as data/fax data, thus preventing inadvertent transmission of data/fax data over a speech/voice data channel.

Transcoder and rate adaption system 304 is coupled to coder/decoder system 310 and rate adaption system 312. Coder/decoder system 310 and rate adaption system 312 may be implemented in hardware, software, or a suitable combination of hardware and software. Coder/decoder system 310 is used to transform data from a first format to a second format, and from the second format back into the first format. For example, if system 300 is used in a wireless communications system that utilizes the Global System for Mobile Communications standard format that interfaces with the public switched telephone network, then coder/decoder system 310 would be used to transfer data between a GSM data frame of full service, enhanced full rate, or half-rate speech and a pulse code modulation data frame format. Other suitable data formats may be converted by coder/decoder system 310.

Rate adaption system 312 is used to adjust the data transmission rate of data received by transcoder and rate adapter system 312. For example, in a wireless telecommunications system that utilizes the Global System for Mobile Communications standard data format, data is transmitted over wireless telecommunication channels at 16 kilobits per second, but is converted by data compression and decompression algorithms into pulse code modulated data at a data transmission rate of 64 kilobits per second. Rate adaption system 312 performs the conversion between the 16 kilobit per second data transmission rate and the 64 kilobit per second data transmission rate. Rate adaption system 312 may also be used to convert from the 64 kilobit per second rate to the 16 kilobit per second transmission rate, or between any other suitable data transmission rates. Rate adaption system 312 and coder/decoder system 310 may be separate functional aspects of a single conversion system.

Interworking function system 306 is coupled to rate adaption system 314. Interworking function system 306 is used to set up and transmit data over data/fax channels to terminal devices that are configured to process data/fax data. Rate adaption system 314 is used to adjust the data transmission rate of data received by interworking function system 306, in a manner similar to that used by rate adaption system 312.

In operation, telecommunications data is received over input channel 318. Data frame detector system 302 determines whether the telecommunications data is voice/speech data or data/fax data, and transmits the data to transcoder and rate adaption system 304 if the data is voice/speech data, or interworking function system 306 if the data is data/fax data. Error detection system 308 is used to determine if the data type improperly changes in the middle of a call. Coder/decoder system 310 and rate adaption system 312 are used by transcoder and rate adaption system 304 to convert the voice/speech data from an air data format to a landline data format and from an air data transmission rate to a landline data transmission rate. Rate adaption system 314 is used by interworking function system 306 to determine the data/fax data transmission rate of the receiving end terminal device and to adjust the data transmission rate to the data transmission rate. The data is then transmitted from either transcoder and rate adaption system 304 to output channel 320, or from interworking function system 306 to output channel 320.

FIG. 4 is a diagram of a wireless telecommunications system 400 embodying concepts of the present invention.

Wireless telecommunications system may be used to control the transmission of voice/speech data or data/fax data from a wireless terminal device to a terminal device accessed through a switched network.

Wireless telecommunication system 400 includes mobile station controllers 402 and 402', base stations 408 and 408', and terminal devices 410 and 410'. Each mobile station controller 402 and 402' includes a transcoder and rate adaption system, 404 and 404', respectively, and an interworking function system, 406 and 406', respectively. The mobile switching centers 402 and 402' are each coupled to the public switched telephone network 422.

A user of terminal device 410 may transmit telecommunications data from transmit antennae 414 to receive antennae 416 of base station 408. This data may include voice/speech data or data/fax data generated by fax device 418. If the user of terminal device 410 transmits voice/speech data to the public switched telephone network 422, mobile station controller 402 processes the data with transcoder and rate adaption system 404 to convert the voice/speech data from a GSM standard format at 16 kilobits per second to a pulse code modulation format at 64 kilobits per second. Suitable standard or customized wireless and wireline data formats may be used, including but not limited to a T1 standard format, an E0 or E1 standard format, a DS0 or DS1 standard format, digital Advanced Mobil Phone Service, Personal Communications Service, or other suitable digital telecommunications standards. Alternatively, if the user seeks to transmit data/fax data, such as by using a fax device 418, mobile station controller 402 uses interworking function system 406 to convert the data to an appropriate data transmission format for use by remote fax device 420.

FIG. 5 is a flow chart of a method 500 for processing wireless voice and data communications in accordance with one embodiment of the present invention. Method 500 may be used in conjunction with a single digital signal processor integrated circuit, an application specific integrated circuit, a field programmable gate array, or other suitable platforms.

Method 500 begins at step 502 where telecommunications data is received. At step 504, it is determined whether the telecommunications data includes speech or voice/speech data, or data/fax data. If the telecommunications data comprises speech or voice/speech data, the method proceeds to step 506. If the telecommunications data comprises data/fax data, the method proceeds to step 512.

At step 506, the format of the data is changed from a first format to a second format. For example, the data is received from a public switched telecommunications network and is to be transmitted to a wireless terminal device, the format of the data may be changed from a wireline format pulse code modulated format to a wireless code division multiple access format or Global System for Mobile Telecommunications format. Alternatively, if the data is received from a wireless terminal device and is to be transmitted over a switched network, such as the public switched telephone network, the data may be transformed from a wireless data format to a wireline data format.

The method then proceeds to step 510 where the data is transmitted at a predetermined rate. For example, if the data is received from the public switched telephone network and is to be transmitted over a wireless network, the data may be transformed from a first standardized rate for the public switched telephone network to a second standardized rate for the wireless network. Alternatively, if the data is received from a wireless network and is to be transmitted over a wireline network, the data may be transformed from a standardized rate for the wireless network to a standardized rate for the wireline network. The method then proceeds to step 518.

If it is determined at step 504 that the data is data/fax data, the method proceeds to step 512 where the data transmission rate is determined. For example, the data transmission rate may be embedded in the received data, may be a standardized data transmission rate, or may be determined through other suitable systems and methods. The method then proceeds to step 516 where the data is transmitted at the data transmission rate determined in step 512. The method then proceeds to step 518.

At step 518, the next group of data is received. For example, the data may comprise frames of fixed lengths, such that the next group of data is the next data frame. Alternatively, the data may comprise frames of varying lengths, or alternating frames of data, so that the next data is an intermittent data frame that is addressed to a particular telecommunications channel. The data may also comprise modulated digital data, such as pulse code modulated digital data, such that the next data may be a grouping of interspersed bits of data in a serial or parallel data stream. The method then proceeds to step 520.

At step 520 it is determined whether there has been a change in the data type. For example, if the first set of data received is determined to be voice/speech data, it is determined at step 520 whether there has been a change to data/fax data. For example, this change may be any change from a first data type to a second data type and two successive groups of data. Alternatively, alternating groups of data types may be acceptable such that the determination of an improper data type change requires a secondary data source to be cross-referenced, such as a table indicating allowable data types for a given data block or telecommunications channel. If the data type change is determined to be unacceptable, the method proceeds to step 522.

At step 522, an error signal is generated. For example, the error signal may comprise data that causes retransmission of a data group to be requested. Alternatively, the error signal may comprise a signal that is used in conjunction with other indicators to determine whether telecommunications channel data transmission process has been corrupted and should be terminated. Also, the error signal may comprise a signal that is used in conjunction with other indicators to determine whether the data contained within that frame is invalid, causing the frame data to be overwritten with some predetermined pattern or idle pattern. The method then proceeds to step 524 and ends.

If it is determined at step 520 that no improper data type changes occurred, the method proceeds to step 526 where the next group of data is processed. For example, if the next group of data is data/fax data, the method returns to step 512. Alternatively, if the next group of data is voice/speech data, the method proceeds to step 506.

In operation, method 500 is used to process telecommunications data that may be of two or more different types, such as voice/speech data, data/fax data, operations data, control data, computer data, or other data types. Method 500 is used to determine the suitable data type and to then process the data according to its data type. Method 500 is configured for optimal use on a single platform, such as a digital signal processing integrated circuit, an application specific integrated circuit, or other suitable circuits. In particular, method 500 is adapted for use with a wireless telecommunications system where it may be necessary to convert from data formats and data transmission rates depending upon the type of data being transmitted, such as voice/speech data, fax data, computer data, or other suitable data types.

Figure 6:
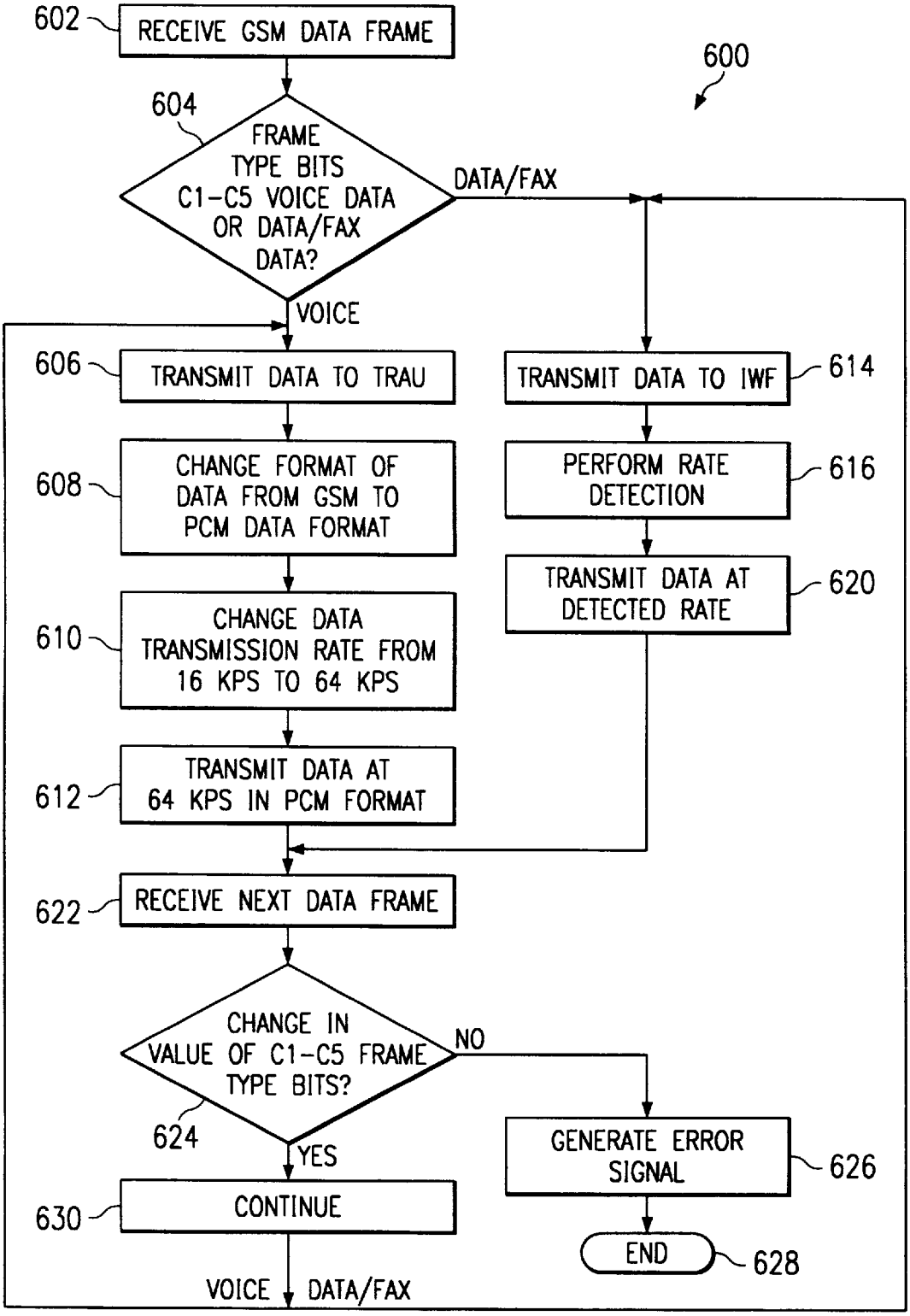
FIG. 6 is a flow chart of a method for processing telecommunications data in a Global System for Mobile Communications data format, in accordance with teachings of the present invention.

FIG. 6 is a flow chart of a method 600 for processing telecommunications data in a Global System for Mobile Communications data format, in accordance with teachings of the present invention. Method 600 may be used in conjunction with a mobile switching center, a base station controller, or other suitable components of a wireless telecommunications system that handles data in a Global System for Mobile Communications (GSM) standard data format.

Method 600 begins at step 602 where a GSM data frame is received. The method then proceeds to step 604, where the frame type bits C1 through C5 are checked against a table or data to determine whether they contain voice/speech data, data/fax data, or other suitable data types. For example, the data may also contain an idle speech frame, an extended data frame, an operation and maintenance data frame, or other frame type bits. A predetermined method may be used to determine how these other frame type bits should be processed.

If frame type bits C1 through C5 indicate that the data is voice/speech data, the method proceeds to step 606. At step 606, the voice/speech data frame is transmitted to a transcoder and rate adaption system. The method then proceeds to step 608 where the format of the GSM data frame is changed to a pulse code modulation data format. For example, the GSM data frame comprises data in a compressed data transmission format such that the data may be transmitted at a rate of 16 kilobits per second. This data format is converted from the GSM data format to a pulse code modulation data format having a higher data transmission rate at step 608. The method then proceeds to step 610.

At step 610, the data transmission rate is changed from the 16 kilobits per second data transmission rate of the GSM standard format to 64 kilobits per second. This change in data transmission rate may be performed as an adjunct to the change in format of data from GSM to pulse code modulation data. The method then proceeds to step 612 where the data is transmitted at 64 kilobits per second in the pulse code modulation data format.

If it is determined at step 604 that frame type bits C1 through C5 comprise data/fax data, the method proceeds to step 614 where the data frame is transferred to an interworking function system. The method then proceeds to step 616, where rate detection is performed, such as by detecting the number V.110 frames in each GSM frame. This detection is accomplished using the bit C6 within the GSM frame. If C6 is one, then the GSM frame contains 4 V.110 frames. If C6 is zero, then the GSM frame contains 2 V.110 frames. At step 620, the data is transmitted after rate adjustment, fax adaptation, modem emulation, and other suitable processes and methods are performed. The method then proceeds to step 622.

At step 622, the next frame of data is received. The method then proceeds to step 624 where it is determined whether there has been an improper change in value type of the C1 to C5 frame type bits. If there has been an improper change in frame type, the method proceeds to step 626 where an error signal is generated. The method then ends at step 628. Alternatively, if the change in value of the C1 to C5 frame type bits is not improper, such as if the frame type is of the same frame type as the preceding frame, then the method proceeds to step 630 and continues with processing of the new data frame. Also or alternatively, alternating frames of data may be allowed such that each voice type data frame is followed by a data/fax type data frame, or a data/fax type data frame may be followed by an operation and maintenance type data frame or an extended data/fax type data frame. In each case, the method proceeds to step 630.

In operation, method 600 is used to process telecommunications data in a Global System for Mobile Communications standard format wireless telecommunications system. Method 600 is optimized for use with a single circuit device of the mobile switching center, such as a digital signal processor integrated circuit, an application specific integrated circuit, a general computing platform, or other suitable data processing devices. In this manner, a telecommunications channel may be used to transmit voice/speech data or data/fax data without requiring that telecommunications channel to be routed to either a transcoder and rate adapter system operating on one device, or an interworking function operating on a different device. This process optimizes the use of processor resources, as a single processor may be used to perform both transcoder and rate adaption system functions and interworking function system functions.

Figure 7:
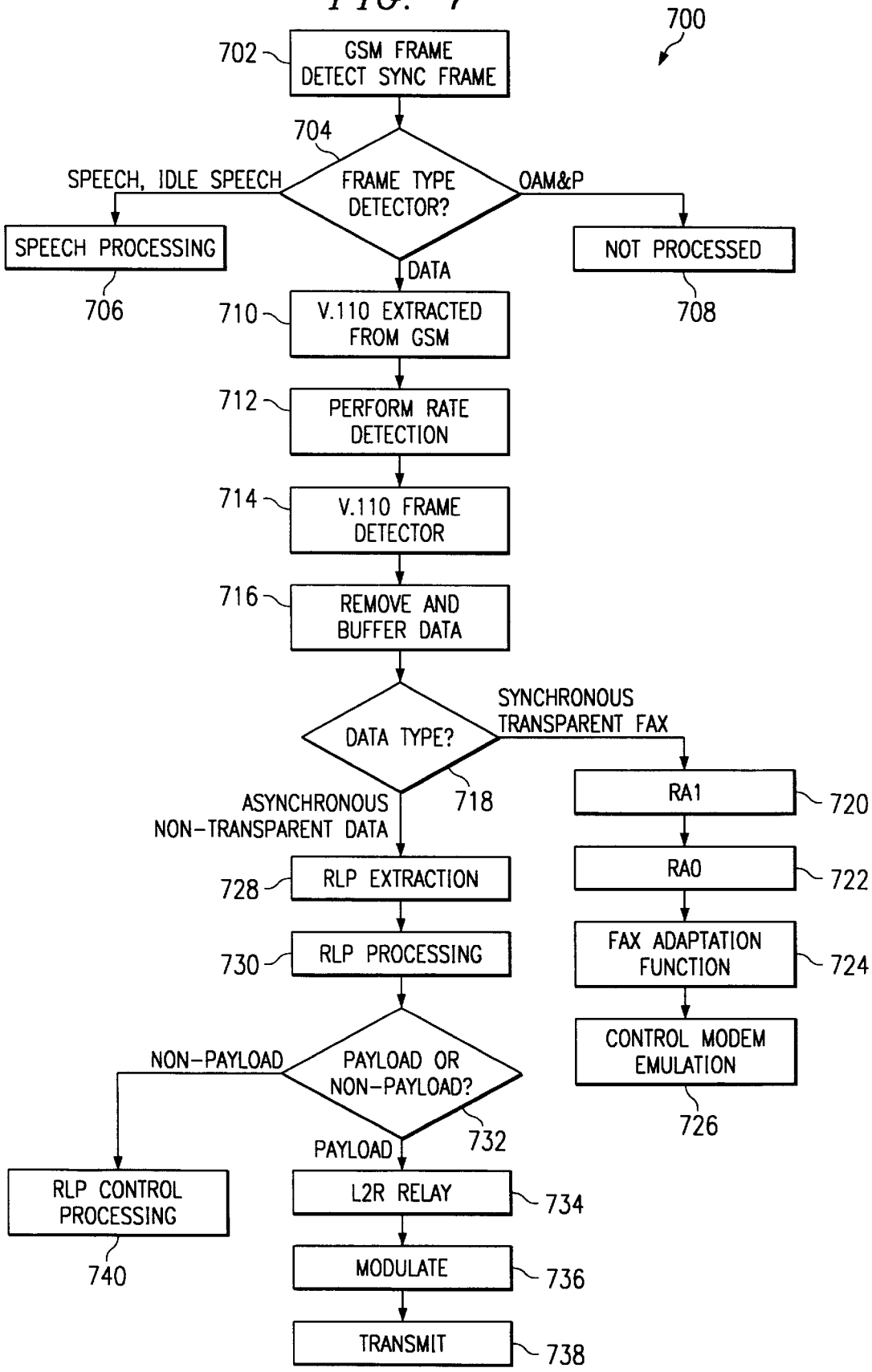
FIG. 7 is a flow chart of a method for performing data/fax data processing in a telecommunications data processing system that includes speech/voice data processing capability and data/fax data processing capability.

FIG. 7 is a flow chart of a method 700 for performing data/fax data processing in a telecommunications data processing system that includes speech/voice data processing capability and data/fax data processing capability. Method 700 may be implemented in software, hardware, or a suitable combination of hardware and software.

Method 700 begins at step 702, where a Global System for Mobile Communications frame detector system receives a frame have a suitable data format, and synchronizes the frame to the system clock. For example, the frame may first be received and stored in a buffer, and then may next be transferred from the buffer in synchronism with the system clock. The method then proceeds to step 704, where a frame type detector determines the type of data that is stored in the frame. For example, the frame may contain speech/voice data, data/fax data, operational data, administrational data, maintenance data, provisioning data, or other suitable data.

If it is determined at step 704 that the frame contains speech data or that the frame is an idle speech data frame, the method proceeds to step 706, where speech processing is performed on the data. If it is determined at step 704 that the frame contains operational data, administrational data, maintenance data, or provisioning data, the method proceeds to step 708. The methods by which this type of data may be processed vary, and may be based upon a publicly known standards or proprietary data. Thus, this information may be passed to a subsystem specifically designed to handle this type of data. If it is determined at step 704 that the frame contains data/fax data, then the method proceeds to step 710.

At step 710, data in a V.110 standard data format is extracted from the Global System for Mobile Communications data frame. The method then proceeds to step 712, where rate detection is performed on the data, such as by determining the number of V.110 frames containing data in each Global System for Mobile Communications frame. For example, if all four V.110 frames are being used, then the data transmission rate is 9,600 bits per second for V.110 frames that have been formatted for transmission in accordance with the Global System for Mobile Communications. If only two of the four V.110 frames are being used, then the data transmission rate is up to 4,800 bits per second. The method then proceeds to step 714.

At step 714, the frames of V.110 data are processed with a V.110 frame detector, such as to separate the payload data from the overhead data. The payload data is then extracted at step 716 and is buffered. At step 718, it is determined what type of data has been carried by the V.110 data frame, such as by processing the overhead data. If the data is synchronous transparent facsimile data, then the method proceeds to step 720, whereas if the data is asynchronous non-transparent data, the method proceeds to step 728. In addition, the method may be adapted to handle asynchronous non-transparent facsimile data and synchronous non-transparent facsimile data.

At step 720, RA1 rate adaption processing is performed on the synchronous transparent facsimile data to remove the "S" bits, "X" bits, and "E" bits from the V.110 data frame. The method then proceeds to step 720, where RA0 rate adaption processing is performed on the synchronous transparent facsimile data. Facsimile adaptation function processing is then performed at step 724, and T.30 and T.4 messages are processed. Modem emulation control data, such as for controlling the operation of a digital signal processing integrated circuit, is developed and processed at step 726 to control the modem for transmission of the synchronous transparent facsimile data. The method then proceeds to step 732, where the processed telecommunications data is then transmitted.

If it is determined at step 718 that the data type is asynchronous non-transparent data, then the method proceeds to step 728. At step 728, radio link protocol frame extraction is performed. The E2 and E3 bits contained within the V.110 frames are examined to find the correct Frame Sequence Indicator sequence for 4 V.110 frames. The sequence is the first frame should have values of (0,0) for E2 and E3. The second frame should have (0,1), the third (1,0), and the fourth (1,1). Once four frames have been identified with the correct frame sequence indicator sequence, 60 predetermined bits are removed from each frames, and are assembled to form a 240 bit RLP frame. At step 730, radio link protocol processing is performed on the asynchronous nontransparent data in order to make the data non-transparent and ensure confirmation. The method then proceeds to step 732, where it is determined whether the telecommunications data is payload or non-payload data. If the telecommunications data is payload data, the method proceeds to step 734, where the payload data is transmitted to L2R relay function. The payload data is then transmitted to a modulation system at step 736, where the payload data is converted to a specific analog modem format, such as the V.32 format, so that the payload data may be transmitted over the public switched telephone network. The modulation may also or alternately comprise protocol functions, such as LAPM, X.25, or data compression. The data is then transmitted at step 738. If the telecommunications data is non-payload data, the method proceeds to step 740, where an RLP control entity is used to process the non-payload data.

In operation, method 700 is used to receive data that is in Global System for Mobile Communications standard data format frames, and to convert the data to a format that is amenable to standard modulation/demodulation processing for the transmission of digital data over the public switched telephoned network. If the data is speech/voice data, operational data, administration data, management data, provisioning data, or other suitable data, method 700 transfers the data to a suitable processing method. If the data is data/fax data, in particular, synchronous transparent facsimile data or asynchronous non-transparent data, then method 700 performs rate detection, rate adaption processing, and other necessary processing.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. A system for processing data, comprising:

a data type detector operable to determine whether a data frame is a voice data frame or a data/fax data frame;

a transcoder and rate adapter system coupled to the data type detector, wherein the data type detector is operable to transfer the data frame to the transcoder and rate adapter system if the data frame is a voice data frame; and an interworking function system coupled to the data type detector, wherein the data type detector is operable to transfer the data frame to the interworking function system if the data frame is a data/fax data frame.

2. The system of claim 1 further comprising an error detection system coupled to the data type detector, the error detection system operable to generate an error signal if a data type field of a present data frame is different from a data type field of a previous data frame.

3. The system of claim 1 wherein the interworking function further comprises a rate adaption system, the rate adaption system operable to receive a data transmission rate and to transmit the data/fax data at the data transmission rate.

4. The system of claim 1 wherein the data type detector, the transcoder and rate adapter system, and the interworking function system are software systems that are programmed on a digital signal processor integrated circuit chip.

5. The system of claim 1 wherein the data type detector, the transcoder and rate adapter system, and the interworking function system are software systems that are programmed on a digital signal processor integrated circuit chip, the digital signal processor integrated circuit chip further comprising:

an input connected to at least one multiple channel input line; and an output connected to at least one multiple channel output line.

6. The system of claim 1 wherein the transcoder and rate adapter system further comprises a coder/decoder system operable to convert data from a first data format to a second data format in a first mode of operation, and to convert data from the second data format to the first data format in a second mode of operation.

7. The system of claim 1 wherein the transcoder and rate adapter system further comprises a rate adaption system coupled to the coder/decoder system, the rate adaption system operable to receive data at a first data transmission rate and to transmit the data at a second data transmission rate, and to receive data at the second data transmission rate and to transmit the data at the first data transmission rate.

8. The system of claim 1 wherein the transcoder and rate adapter system further comprises:

a coder/decoder system operable to convert data from a first data format to a second data format in a first mode of operation, and to convert data from the second data format to the first data format in a second mode of operation; and a rate adaption system coupled to the coder/decoder system, the rate adaption system operable to receive data at a first data transmission rate and to transmit the data at a second data transmission rate, and to receive data at the second data transmission rate and to transmit the data at the first data transmission rate.

9. The system of claim 8 wherein the first data format is a public switched telephone network data format and the second data format is a Global System for Mobile Communications data format.

10. A method for processing data comprising:

receiving a frame of data;

determining whether the data frame contains voice data or data/fax data;

transmitting the frame of data to a transcoder and rate adaption system if the data frame contains voice data; and transmitting the frame of data to an interworking function system if the data frame contains data/fax data.

11. The method of claim 10 further comprising:

determining whether the data type contained in the present data frame is different from the data type contained in the previous data frame; and generating an error signal if the data type contained in the present data frame is different from the data type contained in the previous data frame.

12. The method of claim 10 further comprising:

determining a transmission rate if the data frame contains data/fax data; and transmitting the data frame from the interworking function system at the transmission rate.

13. The method of claim 10 further comprising:

transmitting a transmission rate query to a terminal device if the data frame contains data/fax data;

receiving a transmission rate from the terminal device in response to the transmission rate query; and transmitting the data frame from the interworking function system at the transmission rate.

14. The method of claim 10 wherein transmitting the frame of data to the transcoder and rate adaption system further comprises:

changing the data format of the data from a first data format to a second data format; and changing the data transmission rate of the data from a first data transmission rate to a second data transmission rate.

15. The method of claim 14 wherein the first format is the format for the Global System for Mobile Communications, and the second format is a pulse code modulation format.

16. The method of claim 14 wherein the first data transmission rate is 16 kilobits per second and the second data transmission rate is 64 kilobits per second.

17. A method for processing telecommunications data comprising:

receiving data from a terminal device;

determining whether the data is voice data or data/fax data;

encoding the data for transmission over a network and adjusting the data transmission rate for transmission over the network if the data is voice data; and adjusting the transmission rate of the data if the data is data/fax data.

18. The method of claim 17 wherein receiving data from a terminal device further comprises receiving data from a terminal device in a Global System for Mobile Communications data format.

19. The method of claim 17 wherein determining whether the data is voice data or data/fax data comprises comparing the value of a data field in a data frame to predetermined data values for voice data and data/fax data.

20. The method of claim 17 wherein encoding the data for transmission over a network if the data is voice data comprises encoding the data as pulse code modulation data.

21. The method of claim 17 wherein adjusting the data transmission rate for transmission over the network if the data is voice data comprises adjusting the data transmission rate to 64 kilobits per second.

22. The method of claim 17 wherein adjusting the transmission rate of the data if the data is data/fax data comprises:

determining the data reception rate of another terminal device; and adjusting the transmission rate of the data to match the data reception rate of the other terminal device.

* * * * *